United States Patent [19]
Kühne

[11] 4,421,980
[45] Dec. 20, 1983

[54] POSITION ENCODER WITH CLOSED-RING DIODE ARRAY

[75] Inventor: Christoph Kühne, Giengen, Fed. Rep. of Germany

[73] Assignee: Carl-Zeiss-Stiftung, Heidenheim/Brenz, Oberkochen, Fed. Rep. of Germany

[21] Appl. No.: 302,711

[22] Filed: Sep. 16, 1981

[30] Foreign Application Priority Data

Sep. 17, 1980 [DE] Fed. Rep. of Germany ....... 3035012

[51] Int. Cl.³ .............................................. G01D 5/34
[52] U.S. Cl. ........................... 250/231 SE; 340/347 P
[58] Field of Search ............ 250/237 G, 231 SE, 229; 356/395; 340/347 P; 324/175

[56] References Cited

U.S. PATENT DOCUMENTS 3,509,563  4/1970  Boggs ............................. 340/347 P

FOREIGN PATENT DOCUMENTS 629443  8/1978  U.S.S.R. ...................... 250/231 SE

Primary Examiner—David C. Nelms
Assistant Examiner—J. Jon Brophy
Attorney, Agent, or Firm—Hopgood, Calimafde, Kalil, Blaustein & Judlowe

[57] ABSTRACT

An angular-position encoder has a transparent scale (106) which is rotatably supported between an illumination device (109) secured to the housing and a photoelectric receiver. A self-scanning photodiode array (102) which has an annular photosensitive region (103) is used as the receiver. The otherwise uniform incremental graduation (108) of the scale (102) which is projected onto the array is interrupted at one point by a code field (111) which covers a few diodes of the array. Eased on the numbers of the diodes onto which the code field (111) is projected, the position of the scale (106) is determined as an absolute quantity by a "rough" read-out electronic system, while a "fine" reading (added to the "rough" determination) is effected by an interpolation based on the signal intensities of the other diodes covered by the incremental graduation (108).

4 Claims, 2 Drawing Figures

POSITION ENCODER WITH CLOSED-RING DIODE ARRAY

BACKGROUND OF THE INVENTION

The present invention relates to a device for the measurement of angles via a photoelectrically scanned scale, and therefore to a photoelectric position encoder.

Such devices are used, for instance, in machine tools, theodolites, etc., in order automatically to measure the position of a moving machine part and to feed the result of the measurement (which represents the actual position of the machine part relative to a fixed reference) via electronic means to an indicating unit, or to further process the measurement for control of the machine in question.

Known digital measuring devices with photoelectric-scale scanning can be divided into two groups, on the basis of their function and construction, namely, into (1) absolute-measurement systems which use a so-called coded scale and (2) incremental-measurement systems which use a scale having uniform equidistant graduation.

The manufacture of absolute-measuring systems is very expensive, particularly if high resolution over a relatively large measurement range is to be obtained. Regardless of the selected code, such systems require a number a of resolvable steps which is the quotient of the measurement range divided by the smallest resolvable unit, namely, at least $_2\log a$ code tracks on the scale, as well as an equal number of photoelectric devices for reading the scale.

Incremental-measurement systems, on the other hand, are less expensive since scales with only single-track raster division are required; such systems permit, as when used with the moire effect and electronic interpolation, very much greater resolution than absolute measurement systems. However, since the determination of instantaneous position in incremental systems is based on a continuous summation or subtraction of increments traversed, measurement errors may continuously accumulate, as for example by producing an erroneous pulse upon rapid change in the direction of measurement. This has an especially detrimental effect when the measurement system is in quasi-standstill operation.

To avoid this disadvantage, it is known for instance, from West German Auslegeschrift AS No. 2,540,412 in the case of linear measurement systems to arrange, alongside the raster graduation on the scale used, a number of marks which represent absolute values, and in cooperation with a suitable reading unit serve, upon traversing the same, for repeated initiation of the incremental-measurement system. In this way, the accumulation cycle is reduced; but a device equipped with such a measurement system must be brought at regular intervals into a given position for initiation so that the system is burdened with a cumbersome, and in many cases, disturbing manner of operation.

This disadvantage is also present in the device proposed in West German Pat. No. 2,426,212, which has a plurality of absolute marks arranged at a distance apart which is fixed with the precision of the incremental graduation and therefore can be initiated several times over its measurement range. In the region between absolute marks, however, the measurement system behaves like a purely incremental-operating system, since the detector used for the detection of the absolute marks extends merely over the range of a single absolute mark.

The above remarks on the prior art which are directed to linear position encoders apply by analogy also to angular position encoders (angle encoders). In addition, it should be pointed out that angle encoders react sensitively to eccentricities of the circular scale, and that measurement errors resulting therefrom must be avoided by the greater expense of double scanning, using two detectors which are 180° apart, about the axis of the scale.

EP (European Patent Office) Unexamined Application for Patent (Offenlegungsschrift No.) 00 13 799, describes, inter alia a device for measuring angle by means of a scale which is movable relative to a photodiode array in the form of a circular segment, the incremental graduation of which scale is projected onto the photosensitive surface of the array. Scale and array have raster constants which differ from each other in order to be able to carry out a special, expensive digital-interpolation process. Said EP application, further describes an absolute linear-measurement system which consists of a linear photodiode array and a substantially incrementally graduated scale movable relative thereto; the latter scale has a raster subdivided by a plurality of code fields having different digital characterization. The cost of the manufacture of such special scales is very great.

BRIEF STATEMENT OF THE INVENTION

The object of the present invention is to provide an angular-position encoder which is absolute over the entire measurement range, and which has resolving power and construction costs comparable to incremental systems.

The invention achieves this object in a measurement device wherein the advantages of an absolute-measurement system are combined with those of an incremental-measurement system, while avoiding the inadequacies heretofore inherent in both systems. Only one measurement scale is required, and this scale involves substantially only a single incremental raster which is easy to apply.

By developing the photodiode array as a complete ring, the result is obtained that within the entire measurement range the pattern of a code field is always on the sensor of the read-out unit; and this pattern is formed very simply, for instance by omission of a few graduation marks at any desired point on the circular scale. The numbers of the diodes covered by the code field are thus available in permanently legible manner as information on the absolute position of the measurement system. Initiation of the system is therefore not necessary.

The diode array not only serves for recognition of the position of a code field incident on a small partial region of its photoelectrically useful surface but additionally and at the same time gives, in the order of magnitude of the number of diodes integrated in the array (typically $10^3$ diodes), information concerning the absolute position of an individual graduation of the raster (in each case in fixed relationship to the code field on the scale), and an extremely accurate interpolation can be achieved for the value for the position of the code field, resolved initially in the order of magnitude of the raster constants of the array. As a result, errors in graduation of the scale and errors attributable to manufacturing tolerances of the array average out statistically to a large extent. As the illustrative embodiments show, the power of resolution of the measurement device is fully comparable to that of a conventional incremental system. The cost of manufacture of a suitable arrangement for interpolation is particularly low, without any sacrifice in precision, when the scale and the array have the same raster constant. Interpolation can then be effected by an averaging of the signal intensities of essentially only two diode groups of the array without any great need for storage. For the particular interpolation requirements, a number of possibilities are available within the present state of the art.

Since the individual diodes of an array are generally not acted on simultaneously, but are scanned sequentially by an electronic circuit, a systematic error in the determination of the position can occur when the measurement is effected with the scale moving. The diodes scanned in succession then give measurement values having a phase error which is dependent on their position in the array and on the speed of the scale.

In order to eliminate this defect, it is advantageous not to illuminate the scale continuously, but rather by short light flashes which are synchronized with the scanning cycle of the diode array, thereby enabling flashes to uniquivocally establish the time of a position measurement. Since each array element is capable of storing a charge proportional to the quantity of light incident upon it, practically without loss and for a relatively long period of time, the illumination can take place between the scanning cycles while the measurement system continues to move. In this way, the scanning frequency of the array can be reduced specifically to the amount necessary for the formation of the measurement value in real time.

DETAILED DESCRIPTION

Figure 1:
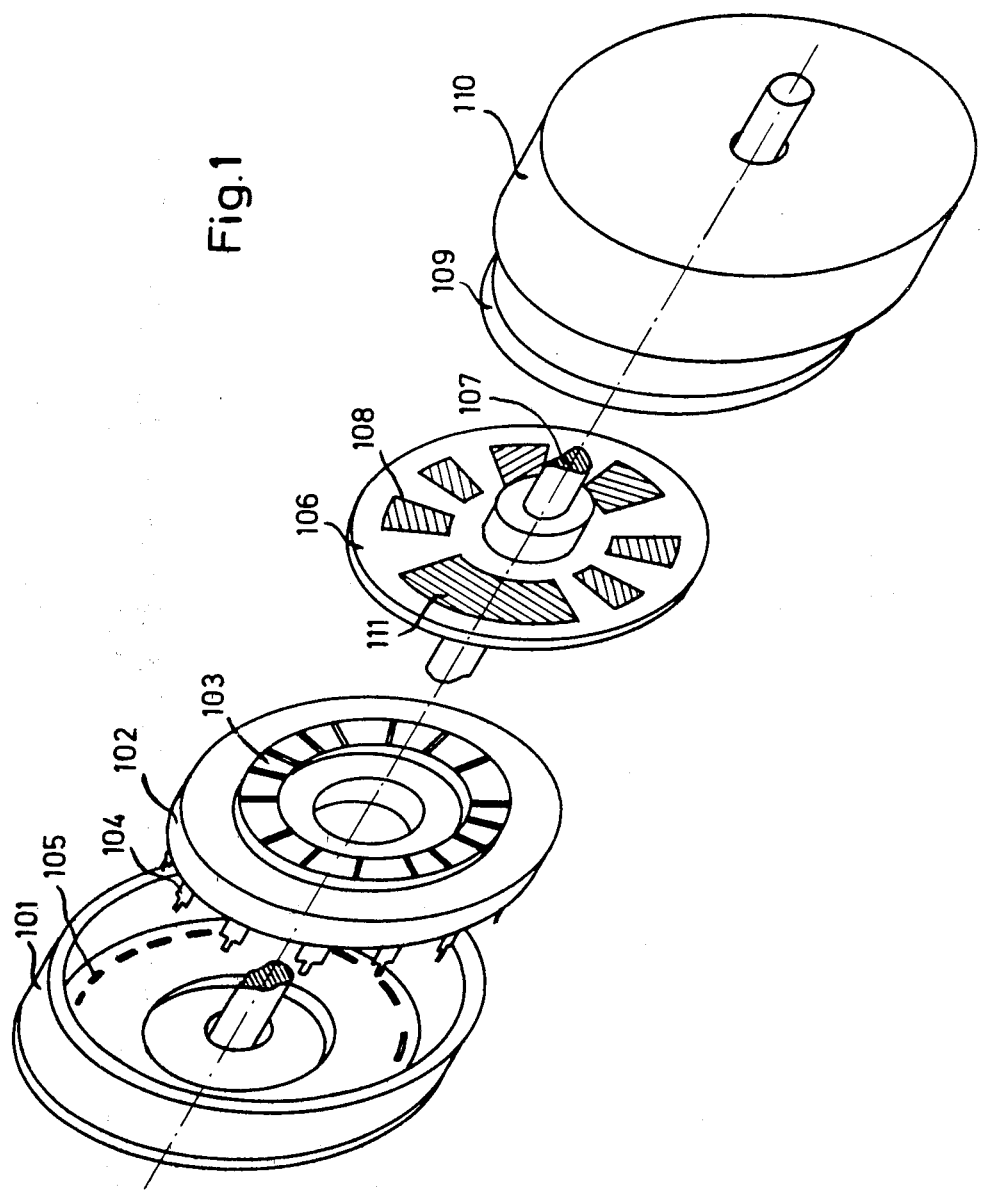
Figure 2:
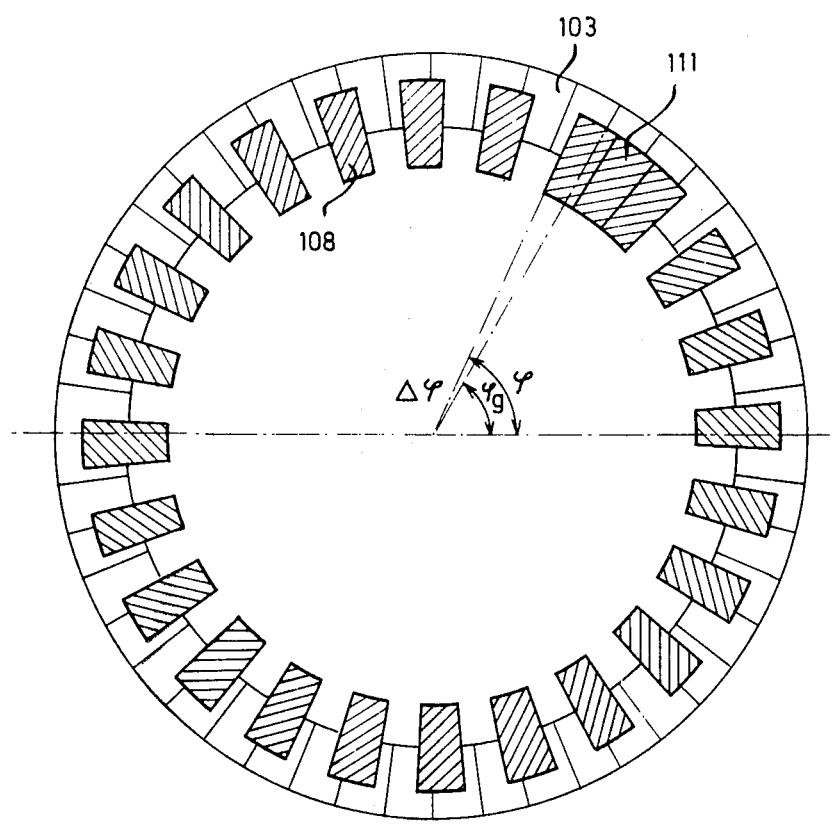

The invention will now be described in further detail in conjunction with the accompanying drawings, in which:

FIG. 1 is an exploded perspective view of an angle encoder of the invention; and FIG. 2 shows the simplified graduation of the scale of FIG. 1 projected onto the surface of an annular diode array.

The housing of the encoder of FIG. 1 consists of two halves 101 and 110, each of which has a central hole. The housing surrounds a transparent disk 106 secured to a shaft 107 passing through the central hole. On the disk 106 there is applied by vapor deposition a substantially incremental division 108 which consists of a sequence of segments of the same size but different light transmittance. The disk 106 may also be of metal into which the light transmitting segments of the graduation are etched in the form of windows. An annular photodiode array 102, hereafter abbreviated pda, is firmly connected via its contacts 104 with the bottom 105 of the housing part 101, said bottom being developed as plug. The light-sensitive region 103, also of annular shape, of the pda 102 faces the scale 108.

Between the housing half 110 and the disk 106 there is a plate 109 fixed to the housing, said plate being covered with light-emitting diodes arranged close to each other. The diodes illuminate the light-sensitive layer 103 of the pda 102 through the transparent graduation 108 by means of light flashes of short duration between the scanning cycles of the pda 102.

The graduation 108 and the pda 102 have the same raster, by which is meant that the width of a light-transmitting and/or a light non-transmitting segment of the graduation 108 is equal to the width of a pda element and the number of diodes of the pda is equal to the number of segments of the graduation 108. Only at one point on the scale graduation 108 is there a code field 111 which consists of three light-impervious segments adjoining each other which therefore has been formed by additional vapor treatment of a single light-pervious segment of the incremental graduation.

The pda 102 may have an even number of 2048 elements, but for simplified illustration, only 48 elements have been shown in FIG. 2, wherein a projection of the scale division 108 on the light-sensitive surface of the pda 102 is schematically indicated, it being understood that the segments of the scale graduation have the same diameter as the diode ring but that, for more ready display, they are shown radially inwardly shifted with respect to the diodes.

The detection of a measurement value is effected as follows:

The code field 111 determines the angular position $\phi_g$ of the scale 108 relative to the pda, with a precision which results from the width of one pda element. For determination of $\phi_g$, an electronic circuit may identify the position numbers of the diodes which are completely covered by the code field 111 and therefore supply an output signal 0, in the form of a digital angular value. The code field 111 may thus effect a "rough reading" of the angle $\phi_g$ in units of the array, wherein:

$$\phi_g = N_g/N$$

in which $N_g$ is the positional number of the element which for the first time after an element with photocurrent 0 again supplies the photocurrent 0, and N is the total number of pda elements.

The "fine reading" involves an interpolation value $\Delta\phi$ which results from the partial sums P and Q of the photocurrents of all even elements p and odd elements q as $$\Delta\phi = \frac{1}{2N}\left(1 + \frac{Q-P}{Q+P}\right)$$

An electronic circuit which determines the value for $\Delta\phi$ from the signal sequence of the pda 102 can be produced with a few parts without great expense.

The exact angle $\phi$ is then calculated as sum of $\phi_g$ (rough value) and $\Delta\phi$ (interpolation value) and gives, with high accuracy and in absolute value, the angular position of the shaft 107 with respect to the housing 101, 102.

Assuming that the annular photodiode array consists of 2048 individual diodes, it is possible with the angular encoder of the invention to measure angles with a precision of $$\delta\phi = \frac{2}{2048} \cdot \frac{0.05}{\sqrt{2048}} \text{ rad} = 3.4 \cdot 10^6 \text{ rad}$$

it being assumed that errors in graduation and the dynamics of the pda cause an error of 5% of the width of an element upon the determination of the traverse of an edge.

This angle error corresponds approximately to the digitalization error of a traditional absolute 18-bit decoder which is determined solely by the fineness of the graduation. Such a decoder has approximately a diameter of 450 mm while the diameter of an angle encoder in accordance with the invention is smaller by more than a factor of 10. Furthermore, it should be noted that eccentricities of the circular graduation 108 do not affect the precision of measurement of the encoder when they are smaller than the width of a pda element, since they average themselves out upon interpolation, as long as the rough reading is not affected thereby.

Of course, instead of a scale divided in even numbers in combination with a pda which has an even number of diodes, it is readily possible to use a scale divided in odd numbers and a pda having a corresponding odd number of elements. In this situation, only the construction of the evaluation electronic system is slightly changed, it being necessary for the electronic circuitry to assure that the photocurrents of elements which (after recognition of the code field) first enter into the odd-number summation member Q are detected by the even-number summation member P, and vice versa; it being understood that the code field may consist, for example, of two to four adjacent segments of the same light transmittance.

Without departing from the invention, it will be understood that the diameter of the diode array and the diameter of the index circle may be different upon employment of a suitable projection optical system wherein the circular graduation is imaged, for example with reduced size, on the photosensitive surface of the array.

What is claimed:

1. A device for the measurement of angles (position encoder) by means of a scale (106) which is movable relative to a photodiode array (102) consisting of a plurality of individual diodes, the substantially incremental graduation (108) of which scale is projected onto the light-sensitive surface (103) of the array (102), characterized by the fact that a code field (111) is arranged on the graduation (108) of the circular scale (106), that an illuminating device (109) is provided for illuminating the scale, that a diode array (102) is used as a detector, said array being developed as a closed ring onto whose light-sensitive surface (103) the scale graduation (108) is imaged with light from the illuminating device (109), and that the number of graduations of the scale (106) is equal to the number of diodes of the array (102).

2. A device for the measurement of angles in accordance with claim 1, characterized by the fact that the annular diode array (102) has an even number of diodes and the code field (111) is formed of three adjoining graduations of the same light transmittance.

3. A device according to claims 1 or 2, characterized by the fact that the diode array is cyclically scanned and that the illuminating device (109) for the scale (106) emits light-flashes which are synchronized with the scanning cycle of the diode array (102).

4. An angle-measuring position encoder, comprising relatively rotatable scale and detector parts, the scale part being circular and including an incrementally distributed plurality of angularly spaced light-transmitting segments and a light-transmitting code field angularly local to at least two of said segments, said detector part including illuminating means on one side of said scale part and a closed-ring diode array having a light-sensitive surface facing the other side of said scale part in position to receive the light-projected image of said scale part.

* * * * *